United States Patent [19]

Engelhart et al.

[11] 3,862,294
[45] Jan. 21, 1975

[54] METHOD FOR FLASH CALCINING INORGANIC MATERIALS

[76] Inventors: Donald Spencer Engelhart, 1060 Drew St., Chicago, Ill. 60643; Ned Henry Engelhart, 52 W. 60th St., Westmont, Ill. 60559

[22] Filed: Apr. 10, 1972

[21] Appl. No.: 242,702

[52] U.S. Cl................ 423/155, 423/175, 423/636, 423/659, 432/14
[51] Int. Cl............................................ C01b 13/14
[58] Field of Search ........... 423/155, 175, 636, 637, 423/279, 659, 625; 432/13, 14

[56] References Cited
UNITED STATES PATENTS

| | | | |
|---|---|---|---|
| 3,271,015 | 9/1966 | Mahony | 423/177 |
| 3,336,109 | 8/1967 | Du Bellay et al. | 423/625 |
| 3,454,357 | 7/1969 | Rhees et al. | 423/279 |
| 3,495,936 | 2/1970 | Jones | 423/492 |
| 3,550,921 | 12/1970 | Stephanoff | 432/13 |

OTHER PUBLICATIONS

Olsen, "Unit Processes & Principles of Chemical Engineering," pgs. 1-3; D. Van Nostrand Co., Inc., N.Y., N.Y., 1932.

*Primary Examiner*—Edward J. Meros
*Assistant Examiner*—Brian E. Hearn

[57] ABSTRACT

Naturally occurring or man-produced inorganic minerals and materials, such as limestone, dolomite, magnesite, hydromagnesite, brucite, to name a few of the most important, are subjected to a process which involves the decomposition of the solids material with release of gaseous compounds and reduction of the material to the oxide on a continuous basis at a minimal retention time utilizing co-current contact of the inorganic solids with the gaseous heat source to produce a highly pure and active oxide of the mineral or material without the use of mechanically motivated parts or mechanisms in the unit as compared to current methods and means known in this art.

6 Claims, 1 Drawing Figure

PATENTED JAN 21 1975
3,862,294
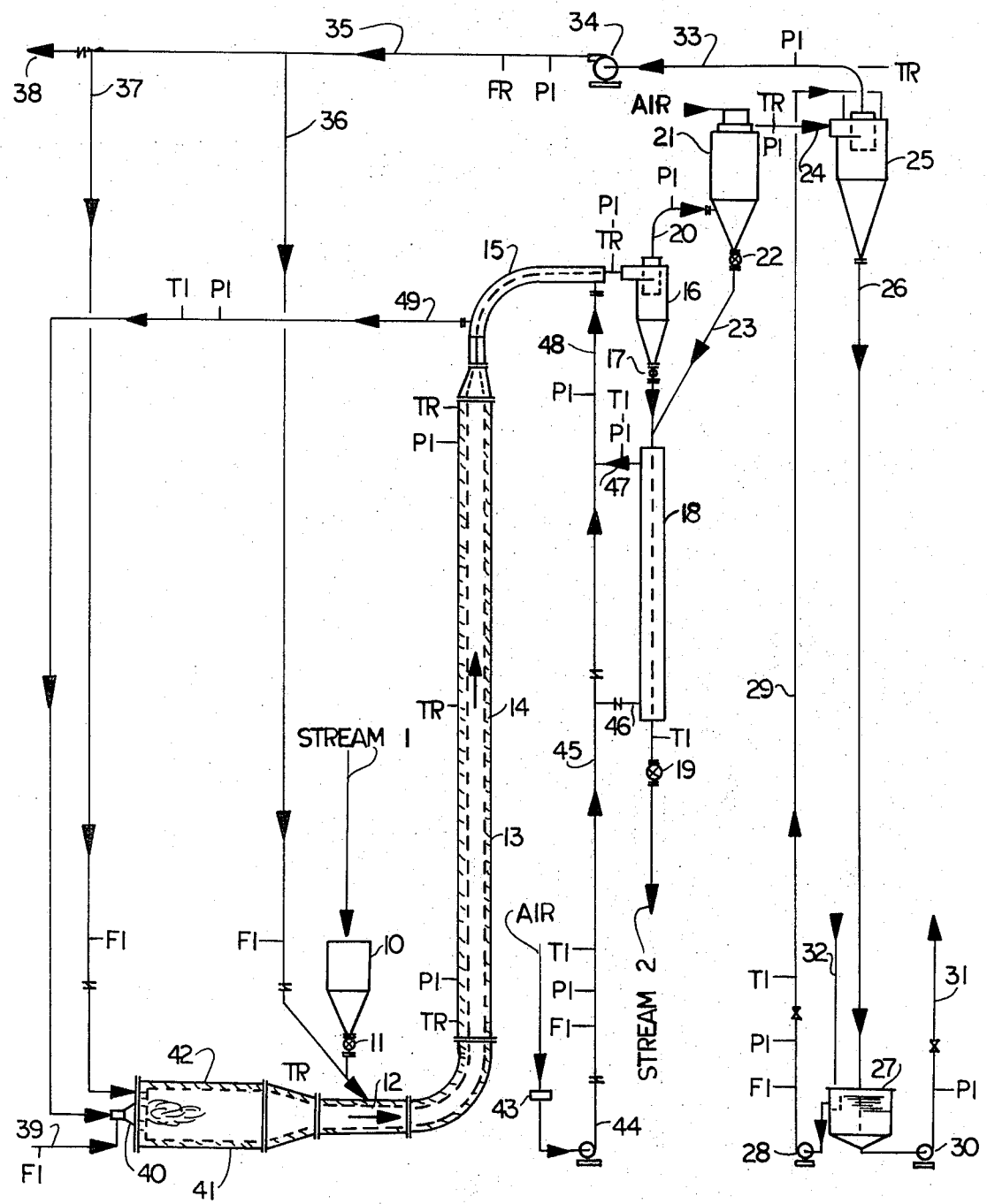

METHOD FOR FLASH CALCINING INORGANIC MATERIALS

DESCRIPTION OF THE INVENTION

This invention relates generally to the flash decomposition of naturally occurring or man-produced minerals or materials to the oxide of the particular mineral or material, such as limestone, aragonite, calcite, dolomite, magnesite, hydromagnesite, brucite, to name a few of the most important, to produce a highly pure and active oxide of the particular mineral or material. More particularly it relates to an improved procedure for the continuous decomposition of the mineral or material compound to effect the efficient reduction of the mineral or material to the oxide at minimal retention or contact time.

It is the general object of the invention to provide an improved method for effecting the efficient decomposition of the material on a continuous basis, control reduction to the oxide of the material, which is unique, novel, practical, requires minimal investment and is characterized by low operational and maintenance expenditures.

Another object of the invention is to provide an improved method for the decomposition of the material compound to the oxide solids material which included a new and novel means of decomposing solids to produce a highly pure and active oxide.

A still further object of the invention is to provide a new and novel means for the decomposition of the solids material with coincident release of the gaseous constituents, controlled heat penetration of the solids material, utilizing co-current contact of the finely divided solids material with heated gases for movement of the solids material through the processing unit and proper design of the unit to achieve a material solids product from which the gaseous components have been released to the equilibrium level, extremently pure and active, as compared to current practice in this art for the particular mineral or material.

It is a still further object of the invention to provide a new and unique method for exposing material surfaces of the mineral or material solids to the co-current heat source to effect efficient decomposition of the solids with release of the gaseous compounds under controlled flow conditions in equipment specifically suited and designed for the particular material with no externally or internally moving parts in the processing unit.

A still further object of the invention is to provide a new and novel means for decomposing mineral or material compounds, utilizing co-current contact solids-gases, proper solid gas ratio and flow control of the solids material through the unit by proper design to achieve intimate solids-gas contact to promote the release of the gaseous constituents, dependent on the particular material, and produce a highly pure and active oxide of the particular material.

A still further object of the invention is to provide an improved method for effecting decomposition of material compounds, such as aragonite, calcite, dolomite, magnesite, hydromagnesite, brucite, utilizing the proper finely divided solids loading of the hot gases stream and heat content at minimal retention or contact time.

It is a still further object of the invention to provide a new and unique method for the reduction of the mineral or material compound to the oxide utilizing flow control of the solids-gases in a co-current means to effect and produce a highly pure and active oxide solids material dependent on the particular material.

Toward the accomplishment of these and other objects of our invention, it contemplates subjecting minerals or material, such as aragonite, calcite, dolomite, magnesite, hydromagnesite, brucite, to name a few of the most important, to a process which involves accelerated decomposition of the finely divided solids mineral or material to the resultant oxide, dependent on the particular mineral or material, in equipment specifically designed to regulate and control the flow of the solids-gases in intimate co-current contact, recognizing solids and gas mass transfer rates, temperature and heat content of the gas stream, temperature driving force gradient of gases to solids, size classification of the solids material, system pressure, overall heat transfer rates, temperature penetration of the solids mineral or material, surface exposed, porosity of the material solids, gas encapsulation of the solids, to mention a few of the most important factors and principles required for the effective and efficient reduction of the feed mineral or material and release of the gaseous constituents to achieve a highly pure and active oxide of the particular mineral or material or minimal retention or contact time.

We are aware that procedures and equipment utilizing mechanical methods for decomposing, calcining, materials have been suggested in the prior art. In a typical prior art procedure, a steel cylinder is inclined slightly from the horizontal and rotates about its axis. Rotation is accomplished by a girth gear which gives peripheral speed to the kiln shell, generally in the range of 20–40 feet per minute, driven by external means through a gear reducer. The steel cylinder, kiln, is supported on two or more girth rings, dependent on the length of the cylinder, each of which moves in a pocket between dual rollers mounted on separate foundations. The cylindrical kiln is prevented from sliding to the lower end by contact of a girth ring face with vertical fixed rollers.

High temperature kilns are lined in part or the entire length of the cylinder with a suitable refractory brick to prevent overheating of the shell with resultant weakening. The feed, generally sized ½–2 inches as an example, is introduced into the upper end of the kiln by various methods dependent on the particular material, chutes, overhung screw conveyor feeder, etc.. The charge moves down the kiln during rotation and the charge volume varies in current practice from approximately 3–12 per cent of the actual kiln volume with retention time in the kiln varying generally from about 120–240 minutes dependent on the particular material, length, slope of the kiln, diameter and rate of rotation.

Firing may be accomplished at either end, depending on whether co-current or countercurrent flow of the charge and the gases is desired. Fuels to achieve the desired temperature of the gases and the charge may be gaseous, liquid, pulverized or solid mixed with the charge. Stationary hoods are installed at the feed and discharge ends of the kiln and the space between the rotating cylinder and the hoods closed by means of a sliding seal.

The hot gases are generally discharged from the unit into dust and fume collection equipment, such as cyclones, settling chambers, wet scrubbers, bag collectors, electrical precipitators, to avoid atmospheric contamination of the ecology. Sometimes heat recovery devices are used in conjunction with the hot exhaust gases to increase the heat efficiency of the unit.

The processing unit described heretofore is usually long in length for the retention time necessary and is characterized by high operational and maintenance charges since the entire unit is rotated by external driven means and the seals require almost constant attention otherwise the efficiency of the unit will be seriously effected.

An object of this invention is to achieve the decomposition of the particular mineral or material as known to the art and current practice which is one-five hundreth or less the retention or contact time required in current techniques and produce a highly pure and active oxide of the particular mineral or material with extremely little or no unburned cores, un-decomposed material.

It is, as mentioned before, a characteristic of methods and procedures such as referreed to, to decompose minerals or materials by methods and means using mechanically motivated equipment or devices to produce the decomposition product somewhat high in un-decomposed solids material (unburned cores), 1–4%, at retention time which is approximately 120–240 minutes generally.

A basic concept of our invention is the effecting of the decomposition of the mineral or material at the proper temperature, dependent on the particular material, with co-current contact of the finely divided sized solids material-gases, minimize un-decomposed material, high purity and active resultant product at minimal retention time.

The method and means presented for the continuous decomposition of minerals or material, aragonite, calcite, dolomite, magnesite, hydromagnesite, brucite, to name a few of the most important, concerns solid and gas mass transfer rates, temperature of decomposition dependent on the particular material, system pressure, surfaces exposed, size of solids, heat penetration of the solid, solids-gas ratio 0.06–0.80, retention time and other pretinent considerations as mentioned heretofore, may vary widely due to the fact that the Earth and man-made materials will vary to a significant degree and the Earth materials may be affected as to domestic or foreign origin, atmospheric and ecological considerations and formation.

The range of solids and gas mass transfer rates in co-current intimate contact in the decomposition unit as an object of this invention is also wide, dependent on the particular material, varying from 75–350 for solids and 190–1,350 pounds per hour-square foot for gas at a retention time which is one-five hundreth or less the contact time required in current art methods and procedures.

Generally speaking, in practice the variables of the composition of the mineral or material, dependent on the particular material solids, intimate co-current contact solids-gases, finely sized solids material, system pressure, temperature and heat content of the gases, decomposition temperature, solid and gas mass transfer rates, solids-gas ratio, surfaces exposed, gases encapsulation of the solids, retention time, no mechanically motivated or driven parts in the processing unit, are such as to cause the decomposition of the mineral or material to the resultant oxide of the particular material with high product purity, activity and extremely low unburned cores.

The invention will be more readily understood by reference to the accompanying drawing in which:

The single FIGURE represents a schematic flow diagram illustrating the procedure of the invention.

In the drawing, the mineral or material, finely sized, Stream No. 1, is discharged from a material handling device into feed bin 10 and introduced into the hot gases refractory lined transfer duct 12 by means of the rotary valve 11 where it is in intimate co-current contact with the hot gases. The solids feed material in the hot gases stream is introduced into the flash calcining unit 13 lined with high temperature refractory 14 where the mineral or material is decomposed to the oxide of the particular mineral or material at a retention time which ranges 0.1 to 25.0 seconds dependent on the particular material decomposition temperature. The hot gases at a temperature ranging from 750°–3,400°F., dependent on the particular material, in intimate contact with the finely divided solids feed material, 100% minus 200 or more mesh, at the proper solids-gases ratio supply the required heat for decomposition.

The gases and the decomposed material solids leave the flash calciner 13 and enter the jacketed heat transfer duct 15 at the appropriate temperature where the heat contained in the co-current solids gases stream is transferred indirectly to air used for combustion of the fuel 39 which may be gas, liquid or pulverized fossil material in heater 41. From the jacketed heat transfer duct 15 the solids-gases stream enters a cyclonic separator 16 where the oxide product solids are separated from the gases to achieve about a 97–99% recovery and are discharged from the cyclone 16 by means of rotary valve 17 and are introduced into a solids-combustion air preheat exchange unit 18 where the temperature of the product is further reduced and the material, Stream No. 2, discharged from the exchanger 18 through rotary valve 19 to material handling equipment to processing, storage or packaging.

Gases containing some solids material are discharged from the separator 16 through duct 20 and enter a bag collector 21 or equal where the solids are collected and discharged from the unit 21 by means of the rotary valve 22 and line 23 for introduction with the solids from unit 16 to the heat exchanger 18 mentioned heretofore. Gases exiting the bag collector 21 or equal through duct 24 contain extremely minute quantities of oxide solids product and these gases enter a wet scrubber cyclonic separator 25 where they are contacted by a water solution to knockout the remaining particulate material forming a hydroxide of the particular material. The solution or slurry, low in hydroxide concentration, is discharged from the wet scrubber unit 25 through line 26 and is sealed in tank 27. The hydroxide slurry settles at a rate dependent on the particular material and the water solution portion overflows the tank and is recirculated by means of pump 28 and line 29 to the wet scrubber spray system of unit 25. Hydroxide slurry, somewht concentrated, settling in the tank 27 is withdrawn by means of pump 30 and discharged through line 31 for further processing, acid neutralization, water treating or other compatible uses as required. Make up water is supplied tank 27 through line 32.

Gases exiting the wet scrubber unit 25 contain extremely little or no particulate material through duct 33 to exhaust fan 34 and are discharged through duct 35 with recycle streams exiting through duct 36 to motivate the feed material discharging from the rotary valve 11 for introduction into the hot gases duct 12 mentioned heretofore and through duct 37 for recycle to the heater unit 41 lined with high temperature refractory 42. The amount of gases recycle through ducts 36 and 37 is dependent on the particular feed material and commensurate operational requirements. The balance of the gases not recycled as mentioned heretofore are discharged to the atmosphere through duct 38 and will meet ecology rules and regulations concerning particulate matter and exhaust gases composition by specific design of the various collection and separation units herein above described for a specific locality.

Ambient air to support combustion of the fuel, gaseous, liquid, pulverized fossil material, 39, is introduced into the system through filter 43 and discharged from a pressure type fan or blower 44 into line 45 with take-off through line 46 to heat exchange unit 18 and exits through line 47, 48 to heat transfer duct 15, mentioned heretofore. Preheated air exits transfer unit 15 through line 49 and is introduced into burner 40 along with the fuel 39 to supply the required heat to decompose the particular feed material.

EXAMPLE

The following is an example of an illustrative mode of carrying out the process of this invention specifically related to the efficient decomposition of limestone, approximately 97.0% as calcium carbonate, although it is to be recognized that the process is applicable to calcite, dolomite, magnesite, hydromagnesite, brucite, to name a few of the most important.

1,825 pounds, surface moisture free basis, finely divided material solids, 100% minus 200 or greater mesh, are introduced into the hot gases stream, temperature 2,400°–3,400°F., to supply the necessary sensible heat and heat of decomposition. The solids-gases in co-current intimate contact, gases encapsulation of the solids, at the proper solids-gases ratio enter the decomposition unit, flash calciner, where the solids are reduced to the oxide of the material at a retention time of 5–15 seconds to achieve approximately 1,000 pounds of product high in purity and activity and containing 0.5% or less unburned cores, un-decomposed material.

It will be understood, of course, that the decomposition equipment item and attendant units may be constructed of any suitable materials of construction capable of withstanding high temperatures, it being properly sized for production rate, such as for example high temperature refractory lined steel, Corten, stainless steels, to mention a few of the most important.

While in the foregoing discussion and the drawing the decomposition unit is shown in a vertical attitude, it is to be understood that the unit may be positioned other than mentioned heretofore dependent on the solid and gas mass transfer rates at minimal retention time.

It will, of course, be recognized that variations in positioning the decomposition unit will be dependent on the particular material to effect efficient reduction to the oxide in conjunction with the optimum combination of retention or contact time, temperature of the decomposition of the material, solid and gas mass transfer rates, proper solid-gases ratio, overall heat transfer rate, to name a few of the most important considerations for the decomposition of mineral or material solids to achieve a product high in purity as known by these presents.

It is to be understood, therefore, that the aforementioned description and example have been given only by way of illustrating and that the process of our invention is susceptible of variations without departing from the scope thereof, which is limited only by the claims which follow.

Since the system of the present invention involves primarily the subjection of a subdivided solid to a high temperature treatment suspended and transported in a moving current of gas, in order to bring about a transformation of the substances of the solid particles, it is desirable that the gas and the solids carried thereby be held as long as necessary at a temperature maintained at or above the temperature at which the desired transformation takes place in a minimum aount of equipment. This means that the rate of the escape of heat from the current of carrying gas and carried solids is, or may become, a critical factor in the operation of the process.

In prior art systems attempting to gain compactness of the apparatus, as by including turns in the path of travel, tends to permit the escape of heat through the walls of the container by the tangential pressure of the contained moving stream of gas and particles.

It is to be observed that in the preferred practice of our invention after the introducing of the solids into the current of intensely heated gases, the combined current of gases and solids is directed into a vertical path wherein the heated gases and the solid particles are carried upwardly with opportunity for the heat of the gases to be applied to the solids with minimum loss of heat through the containing side walls.

In such a system as illustrated in the drawing, the loss of heat through the sidewalls is minimized since the straight bore of the containing tube 13 provides a minimum of exposure to impingement of the gases which move vertically—that is, parallel to the vertical walls— while the tendency of the carried solids is to fall, and require to be impinged by the moving gases to gain support and upward thrust, thereby the opportunity for transfer of heat from the moving gases out through the sidewalls is minimized and the transfer of heat to the solid particles is maximized.

In the system illustrated, the particle heating and transformation zone is high enough to accomplish the above purpose, and then it is followed by a section of the path of travel of the gases wherein maximum transfer of heat from the gases to a heat transfering or extracting section 15 prevails.

In this section 15, which is jacketed, the curve or horizontal bend of the conduit is gainful of the transfer of heat from the particle carrying stream to a stream of air which extracts the heat and carries it back to the furnace or heater unit 41.

The presence of bends or turns in the heat extracting section 15 is beneficial so long as it does not interfere with the free flow of the treated solid particles into the cyclone separator 16. The heat which is conducted through the sidewalls of the product conducting section 15 is saved for recycling whereas the heat lost through the sidewalls 13 is generally not recoverable without loss from the active particle treating zone.

What is claimed is:

1. Method of thermal decomposition to its oxide of a solid inorganic compound in particulate form which comprises the establishing of a high temperature combustion zone by oxidizing fuel in a furnace to produce high temperature gaseous combustion products, conducting the high temperature combustion products in a stream moving in a generally horizontal path, injecting the inorganic compound in particulate form into the stream of hot gases at a point substantially beyond the combustion zone of the furnace, then conducting the stream of gases and contained solids in an upwardly extending path, said path continuing to a point beyond the region of maximum interaction of the solid compound and the current of heated carrying gases, then transfering heat from the stream of solid particles and carrying gases at a point beyond the maximum interaction zone to a separate stream of air moving in countercurrent to that of the said carrying gases and solid particles and conducting said last-named separate air stream into the combustion zone.

2. The method of claim 1 wherein the stream of gases and entrained solids is separated into a stream of subdivided solid particles and a stream of carrying gas, and transfering heat from the stream of finely divided compound back to the combustion zone.

3. The method of claim 1 wherein the current of gases and entrained solid compound is separated into a stream of subdivided solid compound and a stream of gas, and transfering heat from the stream of subdivided compound to the gases in the combustion zone.

4. Method of thermal decomposition of a solid inorganic compound in particulate form into a solid decomposition product and a gaseous decomposition product which comprises establishing a high temperature fuel combustion zone by injection of fuel and air into a closed furnace, conducting the resultant hot gaseous products of combustion in a horizontally extending path, injecting the particulate compound into the emerging hot current of furnace gases and then conducting the current of gases and particulate compound into a vertically extending decomposition zone wherein the hot gases and the solid particles cooperate to decompose the solid particles, and separating the gases and solid particles in a cyclone separator.

5. The method of claim 4 which includes conducting a current of combustion supporting air in thermal contact with the current of hot gases and solid particles as they pass into the separator to add heat to said combustion supporting air and conducting said current of heated combustion supporting air into the fuel combustion chamber.

6. The method according to claim 2 which includes conducting said current of combustion supporting air into thermal contact with the solid particles from said cyclone separator to pick up heat from the same, and transfering said heat to the combustion zone.

* * * * *